No. 828,583. PATENTED AUG. 14, 1906.
O. THIEL.
MANUFACTURE OF IRON.
APPLICATION FILED APR. 28, 1906.
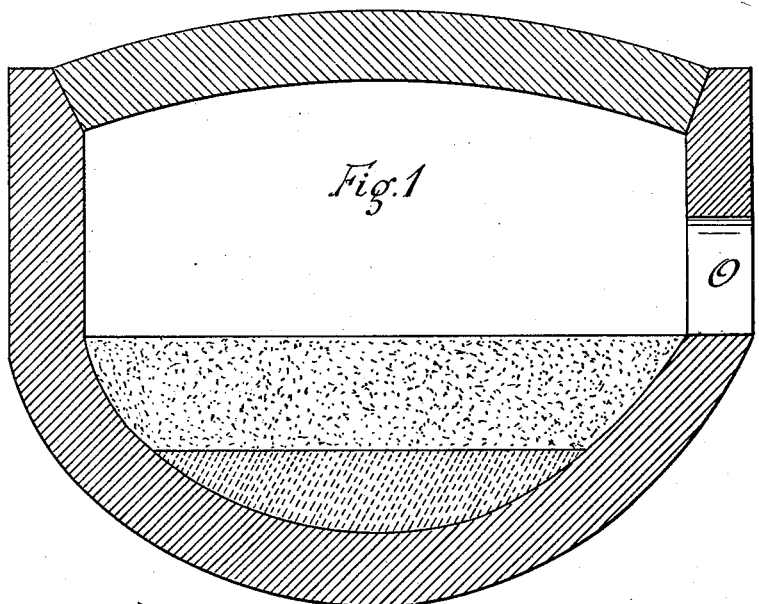
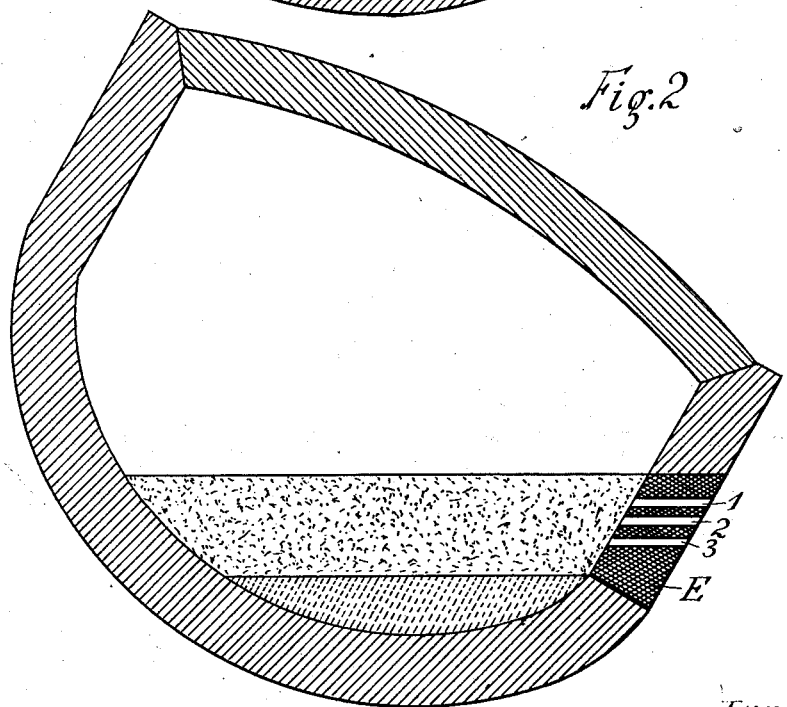
Witnesses:
John L. Lebel
Samuel C. Pearce
Inventor
Otto Thiel
By Dyer & Dyer
Att'ys.

UNITED STATES PATENT OFFICE.

OTTO THIEL, OF LANDSTUHL, GERMANY.

MANUFACTURE OF IRON.

No. 828,583.  Specification of Letters Patent.  Patented Aug. 14, 1906.

Application filed April 28, 1906. Serial No. 314,183.

*To all whom it may concern:*

Be it known that I, OTTO THIEL, a subject of the German Emperor, and a resident of Landstuhl, Rhenish Palatinate, Empire of Germany, have invented a certain new and useful Improvement in and Relating to the Manufacture of Iron, of which the following is a specification.

This invention relates to a process for obtaining iron directly from slag containing oxid of iron.

According to the improved process a slag-bath is produced over an existing liquid-iron bath from iron ore, iron slag, burned pyrites, &c., in an apparatus which is capable of always maintaining the slag and iron in a liquid state. By the introduction of carbon or substances containing carbon in large proportion—such as, for instance, coke, anthracite, &c.—into the slag containing iron oxid the iron separated and precipitated is at once absorbed by the liquid-iron bath under it.

Many years ago attempts were made to melt iron with fluxes and to separate the iron from the slag so obtained by means of carbon without making use of the blast-furnace. In an experiment made for this purpose in a reverberatory furnace it has been, in fact, found possible to produce iron in the shape of ingots surrounded by liquid slag, which ingots could be made into bar-iron or placed in liquid cast-iron. That process for obtaining iron directly from the ore has, however, remained practically unsuccessful, for a slag rich in iron has resulted, there remaining too much iron in the slag. The reduced iron in the shape of an ingot became oxidized in the open air, whereby losses were caused. The necessary subsequent treatment was of course combined with the well-known drawbacks of the manufacture of welded iron.

A complete or nearly complete reduction of iron from a liquid slag containing oxid of iron can be effected in a regular and economical manner only when it is possible to maintain the iron and slag in liquid state before, during, and after the reduction. In the above-mentioned experiments, however, the iron and slag were not obtained in hot liquid state, and they could not reach that state at all. It would have been disadvantageous to maintain the iron liquid, as during the action of the flame a large portion of iron would have been again oxidized. However, in the new process according to this invention the iron and slag are maintained in liquid state before, during, and after the reduction, the liquid iron-containing slag being prepared over a liquid-iron bath. The reduction of the iron-containing slag then takes place over a hot liquid-iron bath, all oxidation thus being avoided. This iron-bath at the same time maintains the slag in a liquid state by its excess of heat, so that only very little outside and auxiliary heating is required. Owing to the whole mass of the slag being maintained liquid the action of the carbon, and consequently the reduction, becomes perfect.

Whether iron ore and lime are converted directly on the iron-bath into a slag or whether in a separate apparatus and the molten slag then poured out onto the iron-bath is immaterial. The consumption of heat required by the reduction of the liquid slag containing oxid of iron is covered by the excess of heat stored up in the iron-bath. Heat can also be supplied at any moment by firing the furnace in which the iron is contained. The iron separated is taken up directly by the iron-bath, so that any loss through oxidation, &c., is avoided.

The process itself can be carried out in any apparatus which is arranged in such manner that it produces the temperature required for maintaining iron and slag in a liquid state. The reduction of the slag is best effected by anthracite, coke, or the like. The reducing material is introduced into the slag in the manner suitable for each individual case—that is to say, from the top, from the side, &c.

A practical method of carrying out the new process will now be described and reference made to the accompanying drawings, showing in Figures 1 and 2 a tipping furnace in diagrammatic cross-section in two working positions.

Let us assume a tipping furnace of one hundred tons capacity, containing sixty tons of liquid iron. On the top of it are melted twenty tons of slag containing oxid of iron, (iron ore with flux—as, for instance, lime.) The openings O, Fig. 1, of the furnace are then properly closed with insertions E, the holes 1 2 3 of which are made similar to the air-holes in the bottom of converters. The furnace is thereupon tipped over, Fig. 2, the slag flows over the insertions, and at the same moment the reducing material (coke-powder, anthracite, &c.) is introduced into the slag through the holes 1 2 3 in the insertions E, if necessary, under pressure. When a large quantity of coke is introduced, the furnace is tipped backward, Fig 1, whereby a good mixing of the slag with the coke is produced. A violent reduction takes place and can be increased by agitation. Then the furnace is tipped over again, Fig. 2, and fresh coke is introduced, and so on until a sample taken of the slag shows that only a very little iron remains in it. The slag poor in iron and a part of the iron are poured off, the iron being subsequently treated according to requirements, while on the top of the iron remaining in the furnace a fresh twenty tons of ore and lime are converted into slag and reduced in the above-mentioned manner.

The supply of carbon can, of course, be effected in various ways. Thus, for instance, carbon-containing materials could be mixed with hot tar, so as to form a thin fluid paste, which is then pumped into the liquid slag. This would be a similar process to that used in working converters.

The reducing substance can also be easily introduced through suitable lateral widening of the furnace and a good mixing obtained. The reducing material is preferably used in a hot state, if possible. It can also be mixed with a small quantity of pulverized ore.

The oxid of carbon produced during the reaction can be utilized in the furnace itself or conveyed away and used for other purposes.

What I claim as my invention, and desire to secure by Letters Patent, is—

1. In the manufacture of iron, forming a slag layer containing oxid of iron upon the surface of an iron-bath, maintaining the slag and iron in a liquid state and reducing the iron from the slag by means of a reducing material whereupon the reduced iron is directly absorbed by the iron-bath.

2. In the manufacture of iron applying a molten slag layer containing oxid of iron upon the surface of an iron-bath, maintaining the slag and iron in a liquid state and reducing the iron from the slag by means of a reducing material whereupon the reduced iron is directly absorbed by the iron-bath.

3. In the manufacture of iron, forming a slag layer containing oxid of iron upon the surface of an iron-bath, maintaining the slag and iron in a liquid state, and reducing the iron from the slag by injecting reducing material into the molten slag, whereupon the reduced iron is directly absorbed by the iron-bath.

4. In the manufacture of iron forming a slag layer containing oxid of iron upon the surface of an iron-bath maintaining the slag and iron in a liquid state and reducing the iron from the slag by blowing in powdered reducing material into the molten slag, whereupon the reduced iron is directly absorbed by the iron-bath.

In testimony whereof I have signed my name to this specification in the presence of two subscribing witnesses.

OTTO THIEL.

Witnesses:
H. W. HARRIS,
JOS. H. LEUTE